Patented July 19, 1927.

1,636,452

UNITED STATES PATENT OFFICE.

HAZELTON S. AVERY, OF SAN JUAN, PORTO RICO.

METHOD OF AND SPRAY FOR EXPEDITING THE RIPENING OF FRUIT.

No Drawing.    Application filed November 27, 1925.    Serial No. 71,752.

This invention relates to a new or improved method of and spray for expediting the ripening of fruit and more particularly citrus fruit.

The primary object of the present invention is to provide a simple but yet effective method of expediting the ripening of more particularly citrus fruits and this while such fruit is still on the tree.

A further object of the invention is to provide a suitable spray for carrying the method into effect.

A still further object is to provide such a spray which, at the same time, will act as insecticide and fungicide.

With the above and other objects in view the invention consists in the method hereinafter described and in the spray used in the execution or carrying out of such method.

It is well known that it has long been the desire of fruit growers to expedite the ripening of fruit in order that a particular crop might be placed on the market at a date earlier than would otherwise be possible. Many of such methods have been proposed but heretofore all of these have involved the treatment of the fruits after they have been taken from the trees.

After considerable experiment, however, I have discovered that the desired object can be accomplished whilst the fruit is still on the tree, and, in fact, apparently the natural activity of the tree itself is taken advantage of in accomplishing the desired end.

In order to carry out my improved method I spray a tree sometime before the normal time at which its fruit is due to mature, for example, one month before, with a solution comprising an oil emulsion and a lime-sulphur compound, with or without a mixing agent, such as is frequently used in connection with sprays in fruit culture, such mixing agent being usually a by-product of milk.

The spray may be applied to any particular tree in any well-known manner either once or at intervals depending upon the condition of the fruit on that tree and upon the results desired, the application of the spray resulting in the formation of a coating or film on the fruit.

From my experiments it would appear that on the first spraying only certain of the fruits thereon will be affected, that is to say, only those which have reached a certain stage of development will show the result of such spraying; then on the second spraying other fruits which have then reached that certain stage will respond, whilst those that responded to the first spraying will be advanced further, and so on. By the use of this spray the fruit is quickly brought to a state of maturity and the green color is changed to yellow.

As to the spray itself this may be made up from any stock commercial lime and sulphur mixture and any well-known oil emulsion may be employed. Or, if preferred, the former may be obtained by boiling together 50 lbs. of lime, 100 lbs. of sulphur and 50 gallons of water in the well-known manner.

As to proportions, the spray which I employ may contain, for example:—

From 1 to 35 parts of the lime-sulphur mixture,

From 1 to 75 parts of the oil emulsion and enough mixing agent to combine the two above-mentioned so that they will not separate, for example, 1 lb. to 100 gallons of the spray.

The spray may of course be made up in any suitable quantity, the quantities of water and of the above-mentioned ingredients being provided accordingly.

I am aware that a lime-sulphur compound as a spray for fruit is old, and also that the use of an oil emulsion for a similar purpose is known, but these have always been used separately.

My invention consists therefore in the discovery that by using the two of them together, with or without a mixing agent, fruit can be caused to mature very much more rapidly than would otherwise be the case, a result that has not been obtained by the use of either or both of them separately and at intervals, or by any other spray or method whilst the fruit is still on the tree.

In addition the spray which I employ acts as an insecticide and a fungicide.

What I claim and desire to secure by Letters Patent is:

1. The method of ripening fruit which comprises applying to the fruit just previous to maturity, a coating of a mixture including an oil emulsion and a lime sulphur compound for the purpose of hastening the ripening thereof.

2. The method of ripening growing fruit which comprises applying to the fruit just previous to maturity, a film of a mixture including an oil emulsion and a lime sulphur compound for the purpose of hastening the ripening thereof.

3. The method of ripening growing fruit which comprises applying to the fruit just previous to the time of maturity a film of a mixture including an oil emulsion, a lime sulphur compound, and a by-product of milk for the purpose of hastening the ripening thereof.

4. The method of ripening growing fruit which comprises applying to the fruit at desired intervals of time just previous to the time of maturity a film of a mixture including from one to thirty-five parts of an oil emulsion and from one to seventy-five parts of a lime sulphur compound for the purpose of hastening the ripening thereof.

5. The method of ripening growing fruit which comprises applying to the fruit at desired intervals of time just previous to the time of maturity a film of a mixture including from one to thirty-five parts of an oil emulsion, from one to seventy-five parts of a lime sulphur compound and about one pound of milk by-product to every hundred gallons of the solution for the purpose of hastening the ripening of the fruit.

In testimony whereof I have signed my name to this specification.

HAZELTON S. AVERY.